United States Patent

[11] 3,588,753

[72] Inventor Harry H. Shimizu
Mountain View, Calif.
[21] Appl. No. 857,754
[22] Filed Sept. 15, 1969
[45] Patented June 28, 1971
[73] Assignee Kruse Electronics

[54] OUTPUT COUPLER FOR A RADIO FREQUENCY OSCILLATOR
23 Claims, 6 Drawing Figs.

[52] U.S. Cl. .......... 333/21R, 333/27
[51] Int. Cl. .......... H01p 1/16, H03h 7/42
[50] Field of Search .......... 333/21, 24—26, 79, 12, 97, 82, 83, 27

[56] References Cited
UNITED STATES PATENTS

| | | | |
|---|---|---|---|
| 2,763,842 | 9/1956 | Olive | 333/97X |
| 2,794,960 | 6/1957 | Ellis | 333/97X |
| 2,845,601 | 7/1958 | Jaffe | 333/97X |

FOREIGN PATENTS

| | | | |
|---|---|---|---|
| 1,058,588 | 5/1959 | Germany | 333/83 |

*Primary Examiner*—Eli Lieberman
*Assistant Examiner*—Marvin Nussbaum
*Attorneys*—Jack M. Wiseman and Thomas E. Schatzel ABSTRACT: An output coupler for a radio frequency oscillator that couples the fundamental frequency signals produced therefrom and suppresses the even harmonic frequency signals produced therefrom. The radio frequency output coupler comprises a shorted, balanced section in the form of a closed loop and an opened, unbalanced section in the form of an opened loop. The opened and closed loops are respectively quarter wave length lines at the highest frequency signal desired. Distributed capacitance across the opened loop to ground with the leakage of the closed loop forms a section to reduce the power of the even harmonic signals. Thus, the fundamental frequency signals are coupled, while the even harmonic signals are rejected.

INVENTOR.
HARRY M. SHIMIZU
BY Jack M. Wiseman
Thomas B. Clark
ATTORNEYS

OUTPUT COUPLER FOR A RADIO FREQUENCY OSCILLATOR

BACKGROUND OF THE INVENTION

The present invention relates in general to output couplers for radio frequency oscillators, and more particularly to output couplers for oscillators employing inductive loop coupling.

Heretofore, output couplers for radio frequency oscillators have had a relatively low power output at the higher frequency signals. It is an object of the present invention to provide an output coupler that has a higher coupling efficiency of the power output of an oscillator at the higher frequency signals. The output coupler of the present invention provides a relatively high-power output at the higher frequency signals and a relatively low-power output at the even harmonic frequency signals. Hence, the fundamental frequency signals are coupled and the even harmonic frequency signals are rejected.

It is a feature of the present invention that the output coupler of the present invention respond to a range of fundamental frequency signals and couple to varying power levels over a range of fundamental frequency signals. In this regard, the output coupler of the present invention couples a relatively more constant power output over a range of fundamental frequency signals. It is desired that the power output of an output coupler should be less than three decibel variation over a range of fundamental frequency signals and the voltage standing wave ratio of the output coupler should be less than the ratio of 2.5 to 1. An object of the present invention is to provide an output coupler with a more constant or flatter power response and an improved voltage standing wave ratio.

SUMMARY OF THE INVENTION

An output coupler comprising a shorted, balanced section and an opened, unbalanced section for coupling the fundamental frequency signals of an oscillator with maximum power transfer at the higher frequencies. The shorted, balanced section of the output coupler is in the form of a closed, inductive coupling loop and the opened, unbalanced section of the output coupler is in the form of an opened inductive coupling loop. Distributed capacitance between the opened, unbalanced section and a grounded transmission line structure reduces the power of the even harmonic frequency signals.

DESCRIPTION OF THE PREFERRED EMBODIMENT

Figure 1:
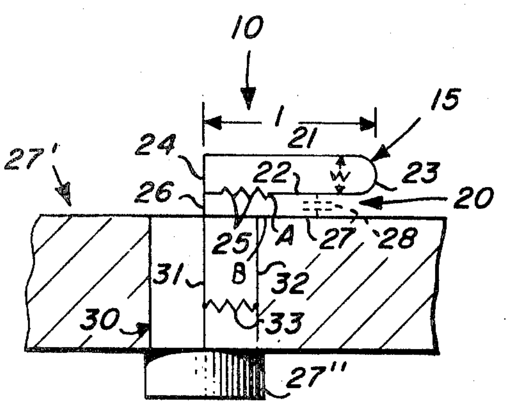
FIG. 1 is a diagrammatic illustration of the output coupler of the present invention.

Illustrated in FIG. 1 is the radio frequency output coupler 10 of the present invention which comprises a shorted, balanced section 15 and an opened, unbalanced section 20. The shorted, balanced section 15 is in the form of a closed, inductive coupling loop and the opened, unbalanced section 20 is in the form of an opened, inductive coupling loop.

The shorted, balanced section 15 comprises line segments 21 and 22 which are interconnected at opposite ends thereof by end conductors 23 and 24. A shunt or damping resistor 25 interconnects the line segment 22 and the end conductor 24. At the highest desired frequency, the closed, balanced section 15 is a quarter-wave length shorted, balanced line.

The opened, unbalanced section 20 comprises the line segment 22, the shunt resistor 25, an end conductor 26, and a grounded transmission structure 27 of a conventional radio frequency oscillator 27′. The end conductor 26 is integrally formed with the end conductor 24 to form a continuous, unitary conductor. Between the line segment 22 and the grounded transmission structure 27 will appear distributed capacitance 28. At the highest desired frequency, the opened, unbalanced section 20 is a quarter-wave length opened, unbalanced line.

A radio frequency coaxial output connector 30 for the coupler 10 includes an output terminal 27″ which is connected to an outer tubular conductor 32. An inner conductor 31 of the coaxial connector 30 is electrically connected to the end conductor 26. The coaxial connector 30 includes a load impedance or resistor 33. The output coupler 10 picks-up or couples radio frequency signals generated or produced by the oscillator 27′ through inductive coupling and applies such signals to the output terminal 27″ through the coaxial connector 30 for transmission to a suitable circuit, not shown. In so doing, the output coupler 10 couples the fundamental frequency signal from the oscillator 27′ to the output connector 30 and suppresses or rejects the even harmonic frequency signals.

Figure 2:
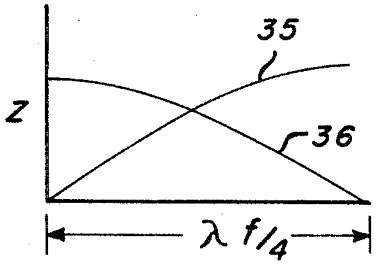
FIG. 2 is a graphic illustration of the impedance along the shorted, balanced section and the impedance along the opened, unbalanced section of the output coupler shown in FIG. 1 taken with respect to a fundamental frequency signal for a quarter of a wave length.

In FIG. 2 is illustrated graphically the impedance (Z) along the shorted, balanced section 15 taken with respect to a fundamental frequency signal for a quarter of a wave length, which is represented by a curve 35. Also graphically illustrated in FIG. 2 is the impedance (Z) along the opened, unbalanced section 20 taken with respect to the fundamental frequency signal for a quarter of a wave length, which is represented by a curve 36. It is to be observed that the impedance of the shorted, balanced section 15 approaches high impedance as the quarter-wave length is approached and the impedance of the opened, unbalanced section 20 approaches zero impedance as the quarter-wave length is approached. Thus, the coupler 10 of the present invention has a high-power output at the higher frequencies.

Figure 3:
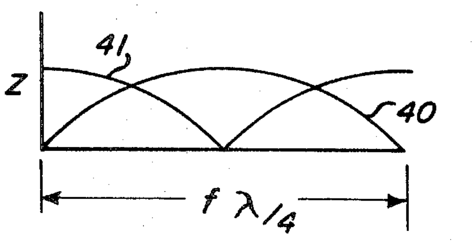
FIG. 3 is a graphic illustration of the impedance along the shorted, balanced section and the impedance along the opened, unbalanced section of the output coupler shown in FIG. 1 taken with respect to a second harmonic signal for a quarter of a wave length.

Reference is made to FIG. 3, which illustrates graphically the impedance (Z) along the shorted, balanced section 15 taken with respect to a second harmonic frequency signal for a quarter of a wave length, which is represented by a curve 40. Also graphically illustrated in FIG. 3 is the impedance (Z) along the opened, unbalanced section 20 taken with respect to the second harmonic frequency signal for a quarter of a wave length, which is represented by a curve 41. It is to be observed that the impedance of the shorted, balanced section 15 approaches zero impedance as the quarter-wave length is approached and the impedance of the opened, unbalanced section 20 is a high impedance as the quarter-wave length is approached.

The distributed capacitance 28 along the line segment 22 to the grounded transmission structure 27 of the opened, unbalanced section 20 reduces the power of the second harmonic frequency signals. The distributed capacitance 28 along with the leakage of the closed inductive coupling loop of the shorted, balanced section 15 forms a section to suppress the second harmonic frequency signals. Thus, the fundamental frequency signals are coupled by the output coupler 10, while the second harmonic frequency signals are rejected or suppressed by the output coupler 10.

The zero impedance at fundamental frequency (FIG. 2) between the grounded transmission structure 27 and the line segment 22 completes the electrical path for getting current from the coaxial connector 30 to be shorted, balanced line 15 across the opened, unbalanced line 20, such as from points B (or ground) to A. At the second harmonic frequency, the impedance is high or open between the points B (or ground) to A (FIG. 1).

It has been found that the diameter of the conductor of the closed loop of the shorted, balanced section 15; the distance "1" between the end conductors 23 and 24; and the magnitude of the shunt resistor 25 are selected to produce the impedance required for maximum power and frequency response for the output coupler 10. Generally, the area surrounded by the loop of the shorted, balanced section 15, and the magnitude of the shunt resistor 25 determine the high frequency power response for the output coupler 10. The distance "W" between the windings 21 and 22 and the magnitude of the shunt resistor 25 determine the low frequency power response for the output coupler 10. Hence, the magnitude of the shunt resistor 25 is selected to maintain a proper power balance for all of the fundamental frequency signals over a selected range. Maximum transfer of power for a given coefficient of coupling is obtained when the impedance of the output coupler 10 is equal to the load impedance of the coaxial connector 30.

In the exemplary embodiment, the radio frequency output coupler 10 of the present invention is constructed as follows:

a. length "1" (FIG. 1) one-half inch to 2 inches;
b. wire size for the line segments 21 and 22 and the interconnecting conductors 0.0222 inch to 0.035 inch;
c. area defined by the closed loop of the shorted, balanced section 15 0.013 square inch;
d. magnitude of shunt resistor 25 33 ohms to 100 ohms;
e. impedance of coaxial connector 30 25 ohms to 100 ohms;
f. fundamental frequency ranges 0.47 GHz. to 1 GHz., 1 GHz. to 4.3 GHz.

Figure 4:
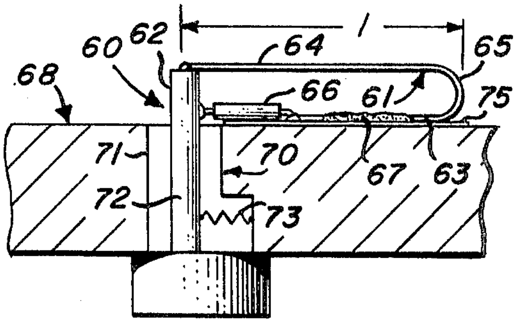
FIG. 4 is a diagrammatic illustration of the output coupler of the present invention showing the construction of the coupler for fundamental frequency signals above 1 GHz.

In FIG. 4 is illustrated an output coupler 60 of the present invention suitable for a range of fundamental frequencies above 1 GHz. The coupler 60 comprises a conductor loop 61 with the free ends thereof suitable connected, such as by solder, to an end conductor 62. The loop 61 includes spaced line segments 63 and 64 interconnected to an end conductor 65. A shunt or damping resistor 66 is disposed adjacent the end conductor 62 and is connected to the adjacent end of the line segment 63. In the exemplary embodiment, the loop 61 is 1 inch or less than 1 inch in length "1" (FIG. 4).

Confronting the line segment 63 of the loop 61 is a grounded transmission structure 67 of a conventional radio frequency oscillator 68. The loop 61 through its line segment 63 is permanently attached to the transmission structure 67 by an epoxy resin. A coaxial connector 70 has an outer tubular conductor 71 that is mounted in the grounded transmission structure 67 and has an inner conductor 72 that is electrically connected to the end conductor 62. A load impedance 73 is connected between the inner and outer conductors of the coaxial connector 70. Between the line segment 63 of the loop 61 and the grounded transmission structure 67 appears distributed capacitance.

For improved voltage standing wave ratio at lower frequencies, the magnitude of the distributed capacitance between the line segment 63 of the loop 61 and the grounded transmission structure 67 should be increased. Toward this end, a strip of Mylar tape 75, in the exemplary embodiment having a thickness of 0.003 inch, is secured to the surface of the grounded transmission structure 67 facing the line segment 63. The strip of Mylar tape 75 serves as a dielectric to improve the distributed capacitance between the winding 63 and the grounded transmission line structure 67.

The diameter of the conductor forming the loop 61 is selected to regulate the magnitude of the distributed capacitance. If desired, the surface of the line segment 63 can be flattened to increase the magnitude of the distributed capacitance. For improved voltage standing wave ratio at higher frequencies, the magnitude of the shunt resistor 73 is predetermined.

When it is desired to have an output coupler for coupling radio frequency signals below 1 GHz., an output coupler 80 (FIGS. 5 and 6) of the present invention may be employed. The output coupler 80 comprises a loop 81 made of suitable material, such as a copper strip. The loop 81 comprises a line or segment 82 and a line segment 83. In the exemplary embodiment of the output coupler 80, the length "1" of the output coupler 80 (FIGS. 5 and 6) is 1 inch or greater than 1 inch. The line segment 82 confronts a grounded transmission line structure 84 to produce therebetween a distributed capacitance. For improving the magnitude of the distributed capacitance, a strip of Mylar tape 85 is secured to the surface of the transmission line structure 84 confronting the line segment 82. A shunt or damping resistor 89 is connected to the line segment 82 and end conductors 86 and 87 interconnect the line segments 82 and 83.

A coaxial connector 90 has an outer tubular conductor 91 mounted in the grounded transmission line structure 84 of an oscillator 84 and an inner conductor 92 connected electrically to the end conductor 87. An output terminal 93 of the connector 90 is connected to the inner conductor 92. A load impedance or resistor 94 interconnects the inner conductor 92 and the outer conductor 91. Solder is employed in the exemplary embodiment for connecting the line segments and ends of the loop 81 and for establishing electrical connections between the coaxial connector 90 and the loop 81.

When the loop 81 has a length greater than 1 inch, there is a tendency for the loop 81 to sag. This action appears to cause changes in the distributed capacitance between the winding 82 and the grounded transmission structure 84. To obviate the tendency of the loop 81 to sag, an insulator block 100 is employed, which is made of suitable, rigid material, such as a glass epoxy or FR-45 material manufactured by Laminated Plastics of San Bruno, California. The dielectric constant or the material used to form the block 100 should be considered, since it will after alter the impedance of the loop 81.

Figure 5:
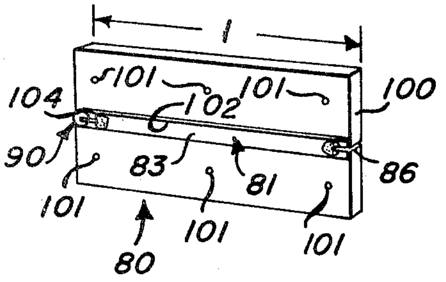
FIG. 5 is a diagrammatic perspective view of the output coupler of the present invention for fundamental frequency signals less than 1 GHz.
Figure 6:
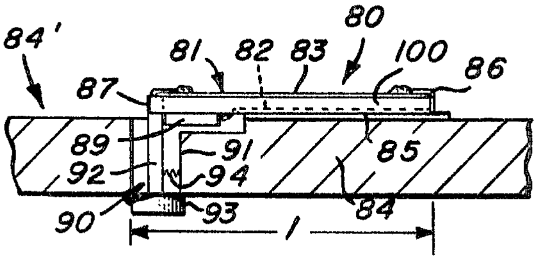
FIG. 6 is a diagrammatic illustration of the output coupler illustrated in FIG. 5.

As shown in FIG. 5, the block 100 includes suitable openings 101 for receiving screws for mounting the coupler 80 to a suitable transmission line structure, such as the grounded transmission line structure 85. A groove 102 is formed around the block 100 to receive the loop 81. A slot 104 is also formed at an end of the block 100 for the inner conductor 92 of the coaxial connector 90.

I claim:

1. An output coupler comprising:
a shorted, balanced section;
an opened, unbalanced section electrically connected to said shorted, balanced section for coupling a fundamental frequency signal to transmit as an output signal;
means confronting said opened, unbalanced section for producing therewith a distributed capacitance along said opened, unbalanced section, whereby an even harmonic frequency signal is suppressed; and
output means connected to said opened, unbalanced section and said shorted, balanced section for transmitting said fundamental frequency signal as an output signal.

2. An output coupler as claimed in claim 1 wherein said means comprises a grounded, transmission line structure.

3. An output coupler as claimed in claim 1 wherein said means comprises a dielectric material disposed on a grounded transmission line structure.

4. An output coupler as claimed in claim 1 wherein said shorted, balanced section is in the form of a closed, inductive coupling loop and said opened, unbalanced section is in the form of an opened, inductive coupling loop.

5. An output coupler as claimed in claim 1 wherein a loop comprises said shorted, balanced section and said opened, balanced section for inductive coupling of the fundamental frequency signal.

6. An output coupler as claimed in claim 2 wherein said shorted, balanced section is in the form of a closed, inductive loop and said opened, unbalanced section is in the form of an opened, inductive coupling loop.

7. An output coupler as claimed in claim 2 wherein a loop comprises said shorted balanced section and said opened, unbalanced section for inductive coupling of the fundamental frequency signal.

8. An output coupler as claimed in claim 3 wherein said shorted, balanced section is in the form of a closed, inductive loop and said opened, unbalanced section is in the form of an opened, inductive coupling loop.

9. An output coupler as claimed in claim 3 wherein a loop comprises said shorted, balanced section and said opened, unbalanced section for inductive coupling of the fundamental frequency signal.

10. An output coupler as claimed in claim 1 and comprising a rigid member of insulating material on which said shorted, balanced section and said opened, unbalanced section are mounted.

11. An output coupler as claimed in claim 4 in which said closed inductive coupling loop and said opened inductive coupling loop includes a common winding, and comprises a shunt resistor connected to said common winding.

12. An output coupler as claimed in claim 5 wherein said loop includes a shunt resistor.

13. In combination, a radio frequency oscillator having a grounded transmission structure, an output coupler connected to said oscillator, said output coupler comprising a closed loop with first and second line segments, said second line segment being arranged to confront said grounded transmission line structure to provide distributed capacitance therebetween, said first and second line segments in said closed loop defining a shorted, balanced section for closed inductive coupling and said second line segment in said closed loop with the confronting transmission line structure defining an opened, unbalanced section for opened inductive coupling for coupling a fundamental frequency signal produced by said oscillator to transmit as an output signal, said distributed capacitance serving to suppress an even harmonic frequency signal produced by said oscillator, and output means connected to said loop for transmitting said fundamental frequency signal as an output signal.

14. A combination as claimed in claim 13 wherein a shunt resistor is connected to said second line segment.

15. A combination as claimed in claim 13 and comprising a strip of dielectric material disposed on said grounding transmission structure and confronting said second line segment.

16. A combination as claimed in claim 15 wherein said second line segment is caused to adhere to said strip of dielectric material.

17. A combination as claimed in claim 15 wherein said closed loop is mounted on a rigid member of insulating material.

18. A combination as claimed in claim 14 wherein said output means comprises a coaxial connector for said output coupler.

19. A combination as claimed in claim 18 wherein said coaxial connector includes load impedance means.

20. A combination as claimed in claim 17 wherein said output means includes a coaxial connector for said output coupler.

21. A combination as claimed in claim 20 wherein said coaxial connector includes load impedance means.

22. An output coupler as claimed in claim 1 wherein said shorted, balanced section and said opened, unbalanced section, respectively, are quarter-wave length lines at a predetermined frequency.

23. The combination as claimed in claim 13 wherein said shorted, balanced section and said opened, unbalanced section, respectively, are quarter-wave length lines at a predetermined frequency.